United States Patent [19]

Brown et al.

[11] Patent Number: 5,485,507
[45] Date of Patent: Jan. 16, 1996

[54] INTEGRATED COMMISSARY SYSTEM

[75] Inventors: Barry D. Brown, Mesquite; Paul A. J. Wakefield, Carrollton, both of Tex.

[73] Assignee: Gateway Technologies, Inc., Carrollton, Tex.

[21] Appl. No.: 226,665

[22] Filed: Apr. 12, 1994

Related U.S. Application Data

[63] Continuation-in-part of Ser. No. 109,830, Aug. 20, 1993.

[51] Int. Cl.⁶ .................................................. H04M 11/00
[52] U.S. Cl. ............................ 379/88; 379/89; 379/112; 379/11
[58] Field of Search ........................ 379/88, 89, 97, 379/100, 201, 105, 91, 93, 115, 144, 90, 84, 96, 112, 77, 84

[56] References Cited

U.S. PATENT DOCUMENTS

| | | | |
|---|---|---|---|
| 3,851,121 | 11/1974 | Marvin | 379/85 |
| 4,559,416 | 12/1985 | Theis et al. | 379/34 |
| 4,815,120 | 3/1989 | Kosich | 379/34 |
| 4,937,862 | 6/1990 | Kosich | 380/3 |
| 4,943,995 | 7/1990 | Daudelin et al. | 379/84 |
| 4,991,203 | 2/1991 | Kakizawa | 379/201 |
| 5,220,501 | 6/1993 | Lawlor et al. | 364/408 |
| 5,283,829 | 2/1994 | Anderson | 379/91 |
| 5,319,702 | 6/1994 | Kitchin et al. | 379/88 |
| 5,323,448 | 6/1994 | Biggs | 379/91 |
| 5,333,181 | 7/1994 | Biggs | 379/91 |
| 5,335,266 | 8/1994 | Richardson, Jr. et al. | 379/88 |
| 5,345,501 | 9/1994 | Shelton | 379/97 |
| 5,351,287 | 9/1994 | Bhattacharyya et al. | 379/95 |

OTHER PUBLICATIONS

"System 20", Value Added Communications (VAC), Nov. 1992, Brochure (4 pages).
"Conquest III Inmate Telephone System", Telematic Corporation, Nov. 1992, cover and pp. H1–H8.

*Primary Examiner*—Jeffery A. Hofsass
*Assistant Examiner*—Scott Wolinsky
*Attorney, Agent, or Firm*—Leo V. Novakoski; Albert C. Smith

[57] ABSTRACT

A commissary system for receiving and processing commissary orders using a premise-based telephone system of an institution such as a jail or correctional facility without accessing a PSTN. User-provided identifier information and item selection information is entered into the commissary system through selected telephones of the premise-based telephone system. User status and inventory information stored in a memory device coupled to a processor are compared with the user provided identifier and item selection information by the processor, according to selected authorization criteria. These criteria may include sufficiency of the user's account balance, item availability, and scope of the user's commissary privileges. The processor generates transaction records for user identified items that meet the authorization criteria, automatically adjusts inventory and user status information, and stores the records in a file where they may be downloaded for record keeping purposes.

11 Claims, 8 Drawing Sheets

INTEGRATED COMMISSARY SYSTEM

RELATED APPLICATIONS

This application is a continuation in part of U.S. patent application Ser. No. 08/109,830 entitled "Selectively Activated Real-Time Recording of Telephone Conversations, which was filed on Aug. 20, 1993.

BACKGROUND OF THE INVENTION

1. Field of the Invention

This invention relates to the field of telecommunications, and more particularly to a system and method for automatically placing commissary orders through the telephone system of an institution, based on a comparison between identifiers and item codes provided by a user and user status and commissary inventory information, respectively, stored in the system.

2. Description of the Related Art

Conventional Interactive Voice Response (IVR) systems operate in conjunction with Public Switched Telephone Networks (PSTN) to automatically provide information and, in some cases, limited transaction control to authorized parties accessing the system from off-site locations. Typical IVR systems capable of collecting data and carrying out user-initiated transactions are known, for example, in the banking industry. Such systems provide bank clients with access to account information and implement client initiated funds transfers by telephone over a PSTN. These IVR systems accept industry standard, dual-toned multi-frequencies (DTMF) and provide selected information and transaction options in response to specific keyed sequences. Transactions are cued by analog voice messages which are often concatenated to provide spoken phrases or sentences conveying instructions or requested information.

The use of such IVR systems in conjunction with a premise-based telephone system of an institution for collecting orders for the commissary of the institution is not known. For example, in institutions such as jails and correctional facilities which employ collect-only telephone systems, the placing of commissary orders is typically a manual process whereby orders are transmitted to a clerk who records the order on paper or in a computer system for subsequent processing. Such manual systems are slow and paper intensive. Therefore, there is a need for commissary systems compatible with the premise-based telephone system of an institution for automatically collecting and processing commissary orders.

SUMMARY OF THE INVENTION

The present invention is a method and a system for automatically processing commissary orders using the premise-based telephone system of an institution such as a prison or correctional facility without accessing a PSTN. In a preferred embodiment of the invention, the commissary system operates as an integral part of a premise-based telephone system such as the CPS-4000 offered by Gateway Technologies, Inc. The commissary system allows administrators to establish criteria for automatically evaluating commissary orders entered by users by comparing user provided identifier and item codes with user status and commissary inventory information, respectively, that is stored in the system.

In accordance with the present invention, the commissary system comprises telephone stations of the premise-based telephone system through which a user enters identifier and item selection information, a memory device for storing user status information and commissary inventory information, a processor coupled to the memory device for comparing user provided information and stored information, and a message generating system responsive to the processor for providing the user with selected status information and for prompting the user to provide identifier and item selection information as needed.

The commissary system is accessed from selected telephone stations of the premise-based telephone system by entering a commissary access number. When the telephone station is connected to the commissary system, the user is prompted by the voice generating device to enter a personal identifier which the processor uses to access user status information stored in the memory device. The user status information includes, for example, the user name, account balances, and user class which determine the scope of the user's commissary privileges. The message generating device is triggered to prompt the user to input item selection and item quantity information once a valid identifier is entered. This information is compared with the commissary inventory information and with the user status information according to a preselected set of criteria such as inventory availability, the user's commissary privileges, and the user's account balances. A transaction record is generated for each order meeting the preselected criteria and stored in a file for processing. These records are automatically processed by the system to adjust user status information such as account balances and the number of restricted items purchased.

Transaction records may be retrieved from the commissary system in electronic form or downloaded to provide hard copy records of all transactions. Transaction records may include, for example, the user's name, the items ordered, the quantity of each item ordered, the total cost, and any adjustments to the users account. These are typically used to fill orders and provide records of inmate purchases.

DESCRIPTION OF THE PREFERRED EMBODIMENTS

Figure 1:
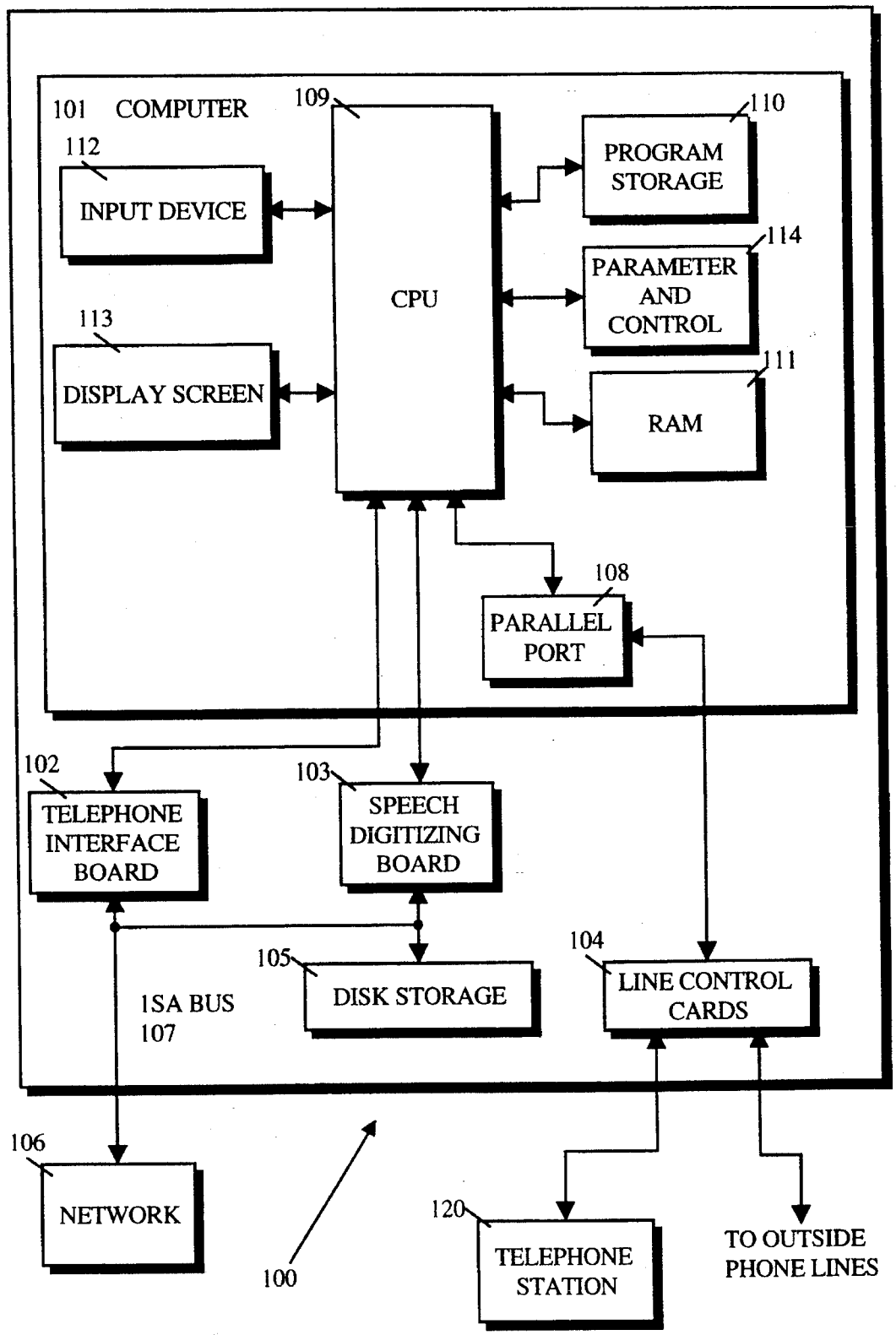
FIG. 1 is a block diagram of the preferred embodiment of the invention.

The preferred embodiment of the present invention operates as an integral part of a premise-based telephone system such as the CPS-4000 offered by Gateway Technologies, Inc. Referring now to FIG. 1, there is shown a block diagram of a typical hardware environment for the present invention. The CPS-4000 telephone system 100 includes a standard personal computer 101 together with a conventional telephone interface board 102 and a speech digitizing board 103. Such boards are available from companies such as Dialogic, Rhetorex, and PIKA. Boards 102 and 103 are connected to disk storage 105 and (if desired) a network 106 via a conventional ISA bus 107. System 100 also includes line control cards 104 for providing switching and access control for the outside telephone lines and for telephone stations 120 connected directly to system 100. Line control cards 104 are connected to computer 101 via a parallel port 108.

Computer 101 contains central processing unit (CPU) 109 that runs software program instructions, stored in program storage 110, which direct CPU 109 to perform the various functions of system 100. Parameter and Control File Storage 114 stores information that is used by CPU 109 in performing the program instructions, as described below. Random access memory (RAM) 111 is used as workspace while performing program instructions and other functions. The system administrator interacts with system 100 by supplying commands via one or more user input devices 112 (such as a keyboard, mouse, and the like). A display screen 113 may be used to provide status information and to prompt the administrator for commands. The processing of phone calls to locations other than the commissary by premise-based telephone system 100 is discussed in detail in the above identified related patent application.

Figure 2A:
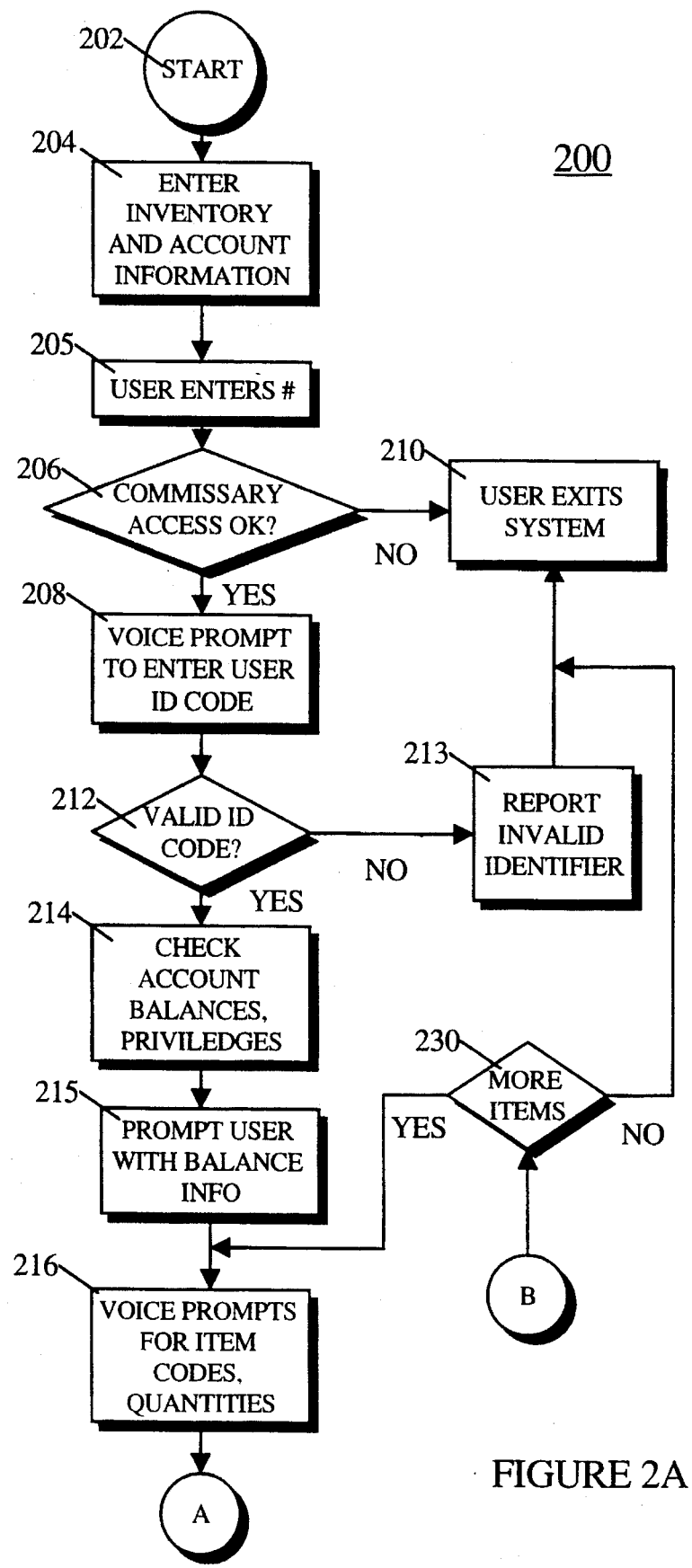
FIGS. 2A–2B are flowcharts showing the overall operation of a commissary system in accordance with the present invention.
Figure 2B:
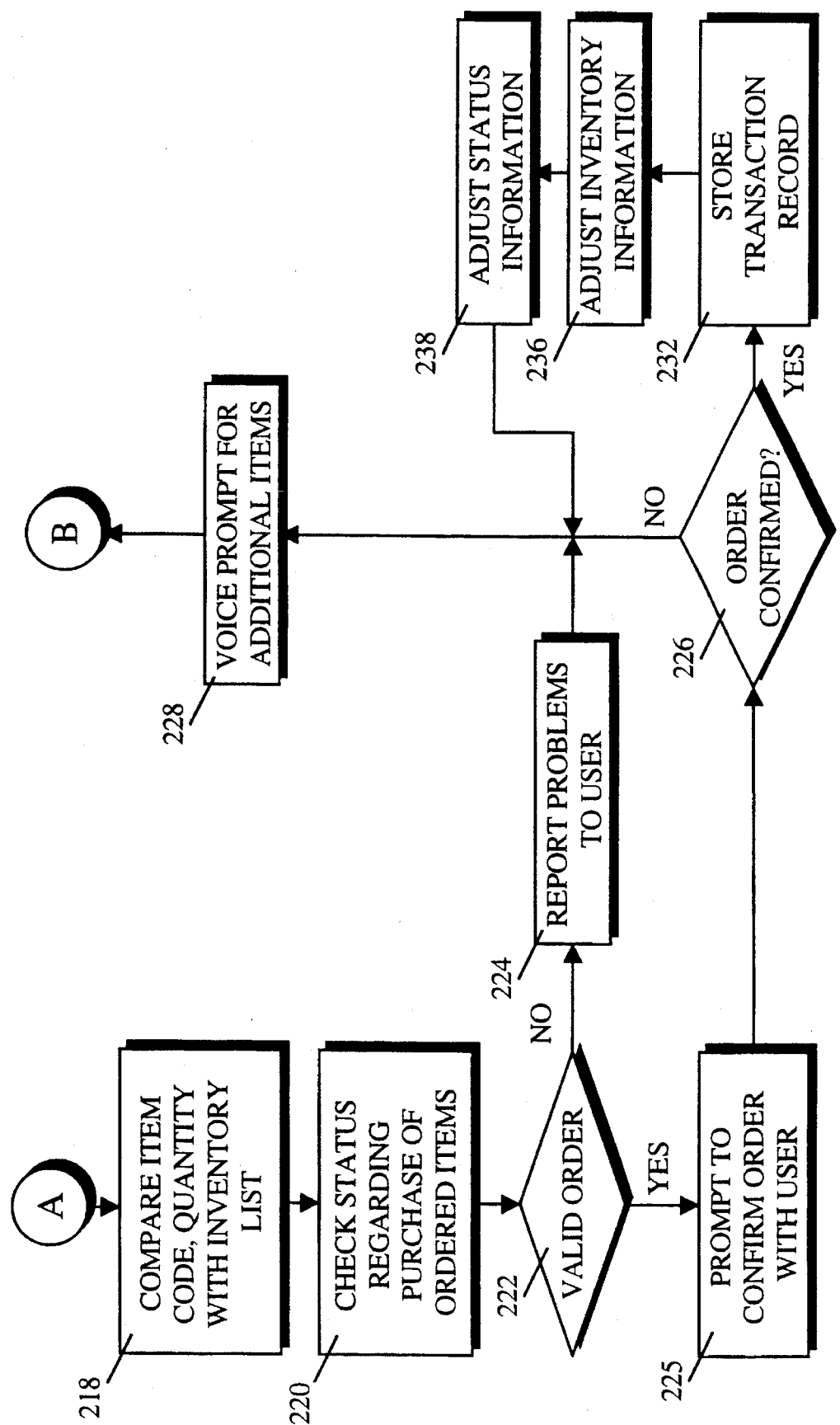

Referring now to. FIGS. 2A–2B, there is shown a flow chart of the overall operation of commissary system 200. In a preliminary step 204, an administrator enters commissary inventory information such as item catalogue numbers, available quantities, item prices, and any quantity limits on restricted items into a data file. Another file includes a set of personal identifiers, each of which is indexed to selected information about a specific user, such as the user's name, account balance, and any applicable restrictions on commissary privileges. The administrator may also set operating hours during which users may access commissary system 200 to enter orders and select specific telephone stations 120 from which commissary system 200 may be accessed. User status information, commissary inventory data, and system operating parameters are entered and modified under software control using input devices 112 and display screen 113.

A user accesses commissary system 200 through any telephone station 120 connected to premise-based telephone system 100 that has been activated for this purpose. Upon hearing a dial tone, the user selects 205 the commissary system 200 by entering an appropriate number. Commissary system 200 is automatically exited 210 when access is attempted outside of selected operating hours or from a telephone station 120 not designated for commissary access. Commissary system 200 may provide a voice prompt at this time informing the user of operating hours or designated telephone stations 120.

When a user accesses commissary system 200 properly, a voice prompt instructs 208 the user to enter a personal identifier. This identifier may be, for example, an assigned personal identification number (PIN) or a word coded in a speech recognition device. A verification step 212 follows in which the identifier is checked against valid identifiers in the user status file, and the system is exited 210 if a valid identifier is not provided. A voice prompt may be activated to report 213 the receipt of an invalid identifier to the user prior to exiting 210 the system. For valid user identifiers, user status information corresponding to the identifier is retrieved 214 from a file in memory 114 and made available to processor 109. The user is prompted 216 to enter item selections and quantities. To facilitate selections, the user may be provided 215 with account balance information at this time. Item selections are checked 218 against available inventory and item restrictions. Item selections are also checked 220 against the user status information to determine whether an order is authorized. The criteria employed to determine whether an order is authorized may include, for example, the availability of the item, the sufficiency of the user's account balance, the user's previous purchases of the item relative to any maximum number of allowed purchases, or any other restrictions on the user's commissary privileges. Failure to meet any criterion checked in steps 220, 218 may thus act as a triggering event to prevent recording an order.

If all order authorization criteria are met 222, the user is prompted 225 to confirm or cancel 226 the order. Confirmation generates 232 a transaction record and commissary system 200 automatically adjusts 236 inventory information and adjusts 238 user status information such as updating account balances and purchased items records. This may be done as each item order is confirmed 226, as shown in FIG. 2B. Alternatively, adjustments may be made after entry of all orders or at a later time when the system is not being accessed. The user is subsequently prompted 228 to either enter 216 additional items or exit 210 the system. When order authorization criteria are not met 222, the message generating unit reports 224 the problem to the user and prompts 228 the user to either enter additional item selections 216 or exit 210 the system.

Confirmed orders are stored 232 in a transaction record in an appropriate data file by commissary system 200 and may be downloaded to provide a hard copy of inventory information and the purchasing patterns of individual users and the institution as a whole.

Figure 3:
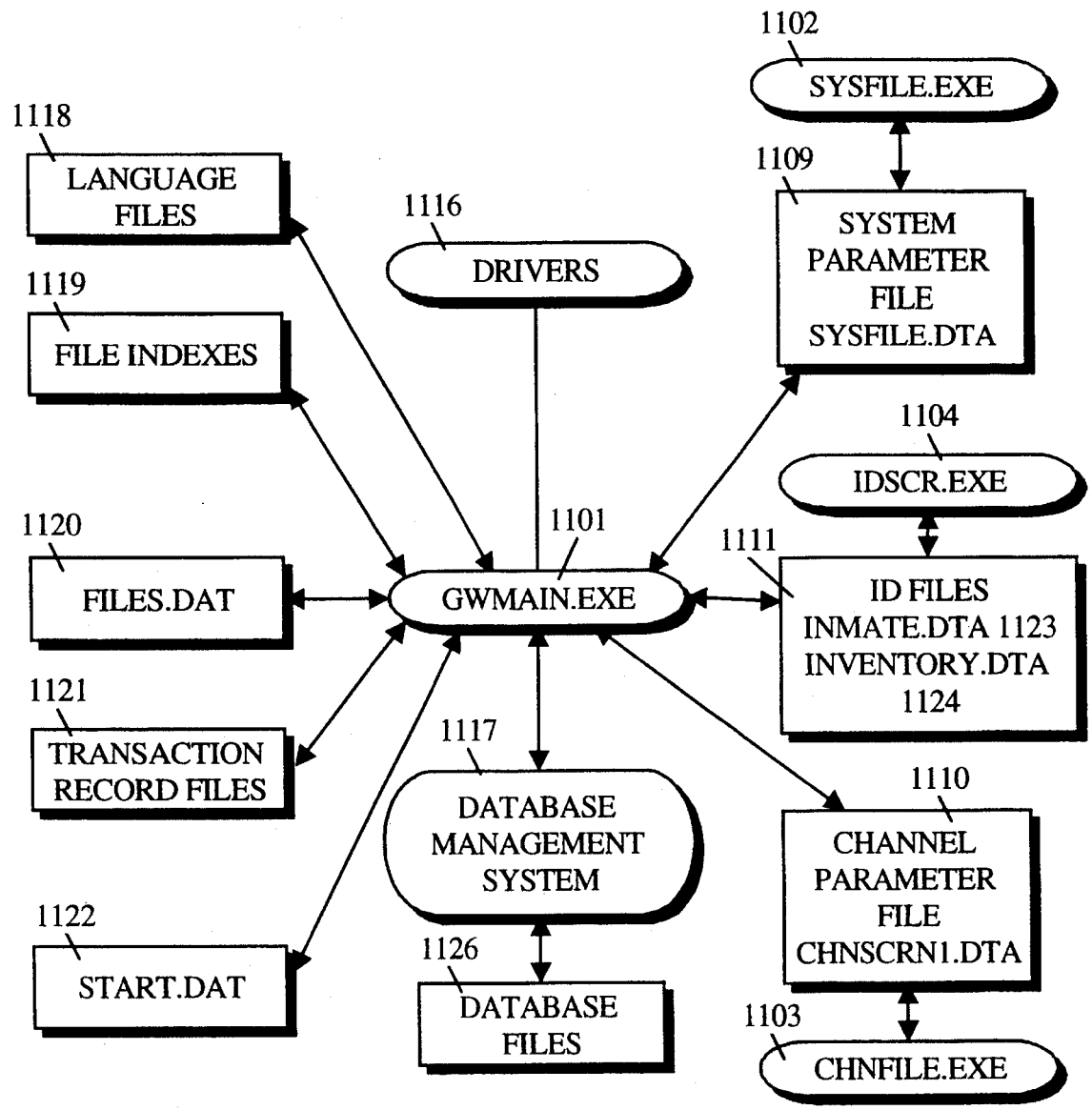
FIG. 3 is a block diagram of the software organization of the system.

Referring now to FIG. 3, there is shown the organizational structure of one embodiment of a software programs and associated files for operating commissary system 200. The software programs include a main program, GWMAIN.EXE 1101, and support programs: SYSFILE.EXE 1102, CHNFILE.EXE 1103, and IDSCR.EXE 1104. The support programs are used to provide administrator access to parameter and control files: System Parameter File SYSFILE.DTA 1109, Channel Parameter File CHNSCRN1.DTA 1110, and ID Files 1111.

ID Files 1111 includes an INMATE.DTA file 1123 containing information about the inmates such as their personal identifiers, account balances, commissary privileges, and any other purchase restrictions that may exist. Information in these files is used for determining whether an order placed by the user should be authorized. ID Files 1111 may also include an INVENTORY.DTA file 1124 in which commissary data is stored. One skilled in the art will recognize that there are many other schemes that can be employed to organize the information contained in the above identified files.

Also included are: drivers 1116 such as Dialogic D40, for providing communication between the Disk Operation System (DOS) of computer 101 with boards 102 and 103.; a database management system 1117 such as Btrieve, for maintaining database files 1126, up to four language files 1118 and file indexes 1119; a configuration file named FILES.DAT 1120 transaction record files 1121; and an initialization batch file, START.BAT 1122.

Language files 1118 are ADPCM compressed, digitized voice prompts stored in a standard DOS file. This file is then indexed using file indexes 1119 to allow access to each of the voice prompts within the file. In the preferred embodiment, language files 1118 are designated as english.vox and spanish.vox, and file indices 1119 are designated as index.1, index.2, etc. Voice prompts for items carried by the commissary are stored in a file designated com.spc that is stored with language files 1118. These prompts are accessed through index file, com.idx that is stored with file indices 1119. Additional language files and file indexes may also be provided.

In the preferred embodiment of the invention, descriptive information concerning authorized, confirmed transactions is placed in output files called Transaction Records (TRs) These files are stored on drive "D ": in a subdirectory called \TR. The files include information such as the user name, the selected items and quantities requested, the total cost of the order, and adjustments to the users account balance.

FILES.DAT 1120 is a data file used by the system to determine the location of necessary files for GWMAIN.EXE 1101. For each file needed by the system, FILES.DAT 1120 lists a file identifier and a path indicating the location of the file in Parameter and Control File Storage 114. The following is a typical FILES.DAT file 1120:
SYSTEM,sysfile.dta
CHANNEL,chnscrl.dta
INDEX1,C:\main\speech\index.1
INDEX2,C:\main\speech\index.2
LNG1,C:\main\speech\english.vox
LNG2,C:\main\speech\spanish.vox
TR,D:\TR\

GWMAIN.EXE 1101

GWMAIN.EXE 1101 is the main program for controlling the operation of integrated telephone system 100 in general and commissary system 200 in particular. GWMAIN is an event-driven, real-time, multitasking program that runs in conjunction with MS-DOS 5.00. It is modular in design, allowing for control of complex functions while facilitating program maintenance and updates for future applications. GWMAIN.EXE 1101 uses parameter files and control files 1109–1111 that can be easily changed to maximize flexibility and ease of support.

Referring now to FIGS. 4A–4D, there is shown a detailed flowchart of the operation of GWMAIN.EXE 1101 in the preferred embodiment, as it relates to commissary system 200. In a standby state, telephone system 100 checks 1502 to see if the telephone 120 is off-hook. If so, it prompts the user 1504 to select a language by pressing one of the alpha-numeric or control keys on telephone 120. For example, if the user presses "1", the system 100 provides voice prompts in English 1506; if the user presses "2", system 100 provides voice prompts in Spanish 1508; and if the user presses any other key or if the user fails to respond within a preset time limit (time-out), system 100 interprets this to be an invalid selection 1510, informs 1516 the user that the call cannot be completed, sounds a "fast busy" signal 1540, checks that the user has hung up 1542 and returns to step 1502.

After a language has been selected 1504, the user is prompted 1512 to dial a telephone number. If the user dials an invalid number 1514 (or there is a time-out), the system informs the user that the call cannot be completed 1516, sounds a "fast busy" signal 1540, checks that the user has hung up 1542, and returns to step 1502. If the user dials the commissary number 1518, a file is checked 1520 to determine whether the commissary is open. If so, the user is prompted 1522 to enter an identifier. If the call is made when the commissary is closed 1520, the user is informed that the call cannot be completed 1516, and the system returns to 1502 by the usual steps (1540, 1542). If a number other than the commissary number is entered, the system enters 1544 a mode for accessing a Public Switched Telephone Network (PSTN).

The identifier entered by the user is compared 1528 with a list of valid identifiers stored in a data file accessible to processor 109. If the identifier is not valid, i.e. does not match any of the stored identifiers, and the user has not exhausted a preset number of attempts 1526, the user is informed 1524 that the identifier is not recognized and prompted 1522 to enter an identifier again. If the user has exhausted the allowed number of attempts 1526, the user is informed 1516 that the call can not be completed and the system is by exited by the usual steps (1540, 1542).

Once a valid identifier is entered, commissary system 200 automatically retrieves 1530 the user status information which is indexed by the user's identifier. The user's account balance is reported 1532 to the user, who is then prompted 1534 to place an order or exit the system by pressing a selected key on telephone 120. For example, if the user enters "7", commissary system 200 enters an order recording mode 1536. If the user enters "8", an invalid number is entered or a time-out occurs 1538, system 100 is exited through the usual steps. In an alternate embodiment of the invention, user prompt 1534 may include an additional option of entering an on-line catalogue mode 1535 to determine what items are available to the user and in what quantities.

A selection to enter an order in response to order prompt 1534 engages order recording mode 1550 of commissary system 200. As a preliminary matter, a data file is checked 1552 to determine the scope of commissary privileges to which the user is entitled. For example, in one scheme, each identifier is assigned a different privilege class which may authorize the user for unrestricted access to the commissary, access to certain items or certain quantities of items, or no access at all. In commissary system 200, such privilege class codes are entered into the user status file (INMATE.DAT 1123) by an administrator, and may be updated as necessary.

If class check 1554 indicates the user has no commissary privileges, the user is informed 1556 of this status and commissary system 200 is exited 1558. Users having commissary privileges are prompted 1560 to enter an item they wish to order. If the user"s commissary privileges do not include the entered item 1562, the user is informed 1564 and prompted 1592 to enter a new item number. For authorized items, the user is then prompted 1566 to enter a quantity of the item. As a preliminary matter, the stock of the requested item is checked 1568 and if it is unavailable, the user is so informed 1570 and asked to enter another item 1592. If an item is in stock, the requested quantity is checked 1572 against a maximum allowed quantity. Such maximum purchase quantities may be set for example, according to the purchasers privilege class. If the maximum quantity of the item has already been purchased, the user is informed 1574 and prompted 1592 to enter new items or exit the system.

Once a user has been cleared to purchase an available item in the desired quantities, the user's account is checked 1576 to determine whether the user's account balance will cover the cost of the ordered items. If the account balance is insufficient, a prompt 1578 informs the user and prompts 1592 the user for additional items. If the user's account balance is sufficient to cover the cost of the requested items, a message 1580 informs the user of the items ordered, the quantity ordered, and the total cost. Another prompt 1582, directs the user to enter a code to confirm or cancel the ordered items by pressing a selected key on telephone 120. For example, in FIG. 4C, entering a "1" confirms the order and entering a "2" cancels the order. If the order is confirmed, the inventory file is decremented 1585 by the ordered quantity, the record of the user's purchased quantity is incremented 1587 by an equal amount, the user's account is adjusted 1588 by the cost of the order, and a transaction record is entered 1590 in a transaction record file. The user is then prompted 1592 to enter additional items or to exit the system. Adjustment steps 1585, 1587, 1588, 1590 may each be carried out either immediately or at a subsequent commissary cycle, wherein commissary personnel access various data files for order processing, as discussed in conjunction with FIGS. 2A, 2B.

If the order is canceled, an invalid number is entered, or a time-out occurs at step 1586, adjustments 1585, 1587, 1588, 1590 are not made and the user is prompted 1592 to either enter additional items or exit the system. Whether the order is confirmed 1584 or canceled 1586, the system prompts 1592 the user to either make additional entries or exit the system. At step 1594, the system directs the user to order loop 1560 or exits the system 1558 according to the user's response to prompt 1594.

Figure 4A:
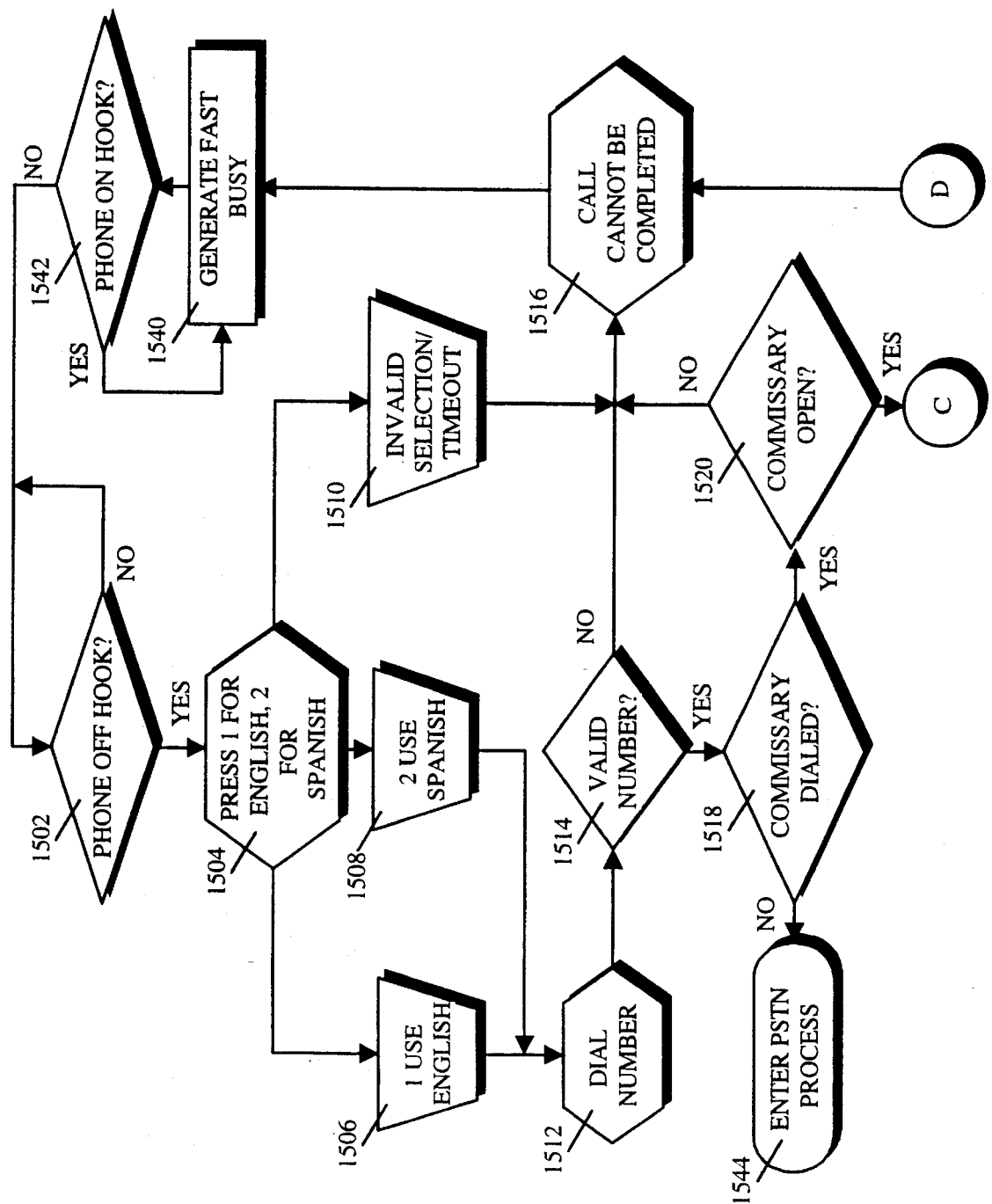
FIGS. 4A–4D are detailed flow charts showing the operation of GWMAIN.EXE.
Figure 4B:
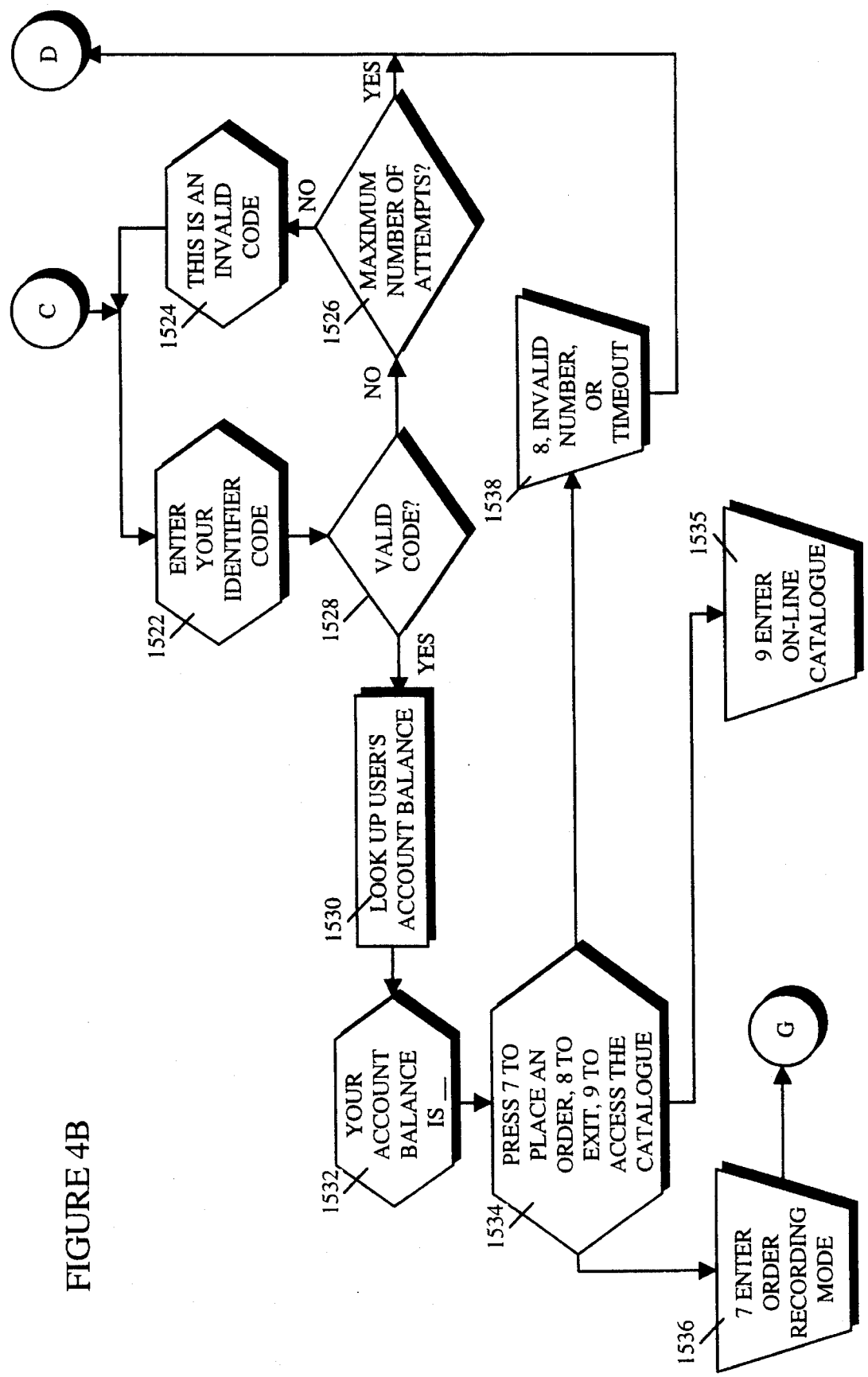
Figure 4C:
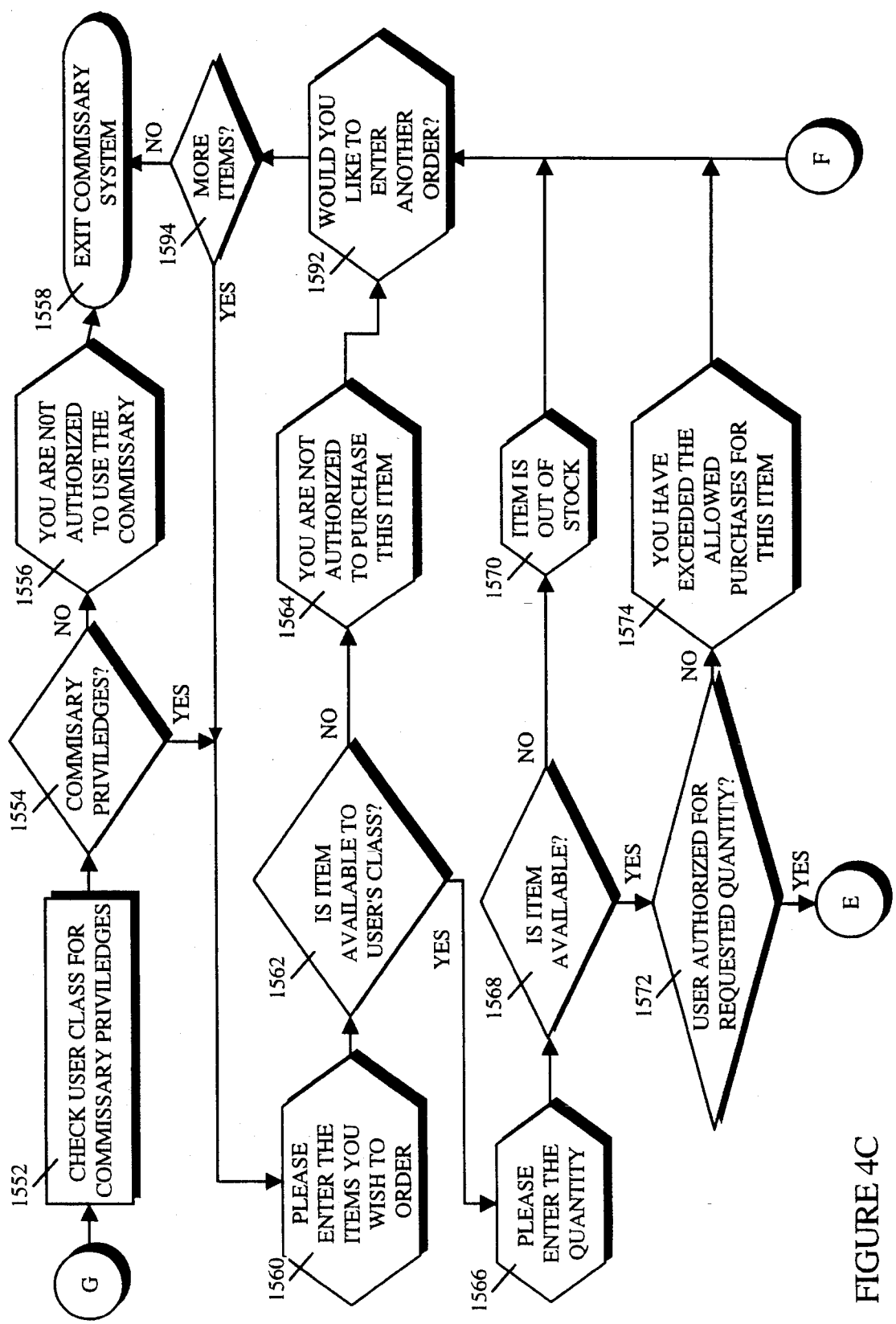
Figure 4D:
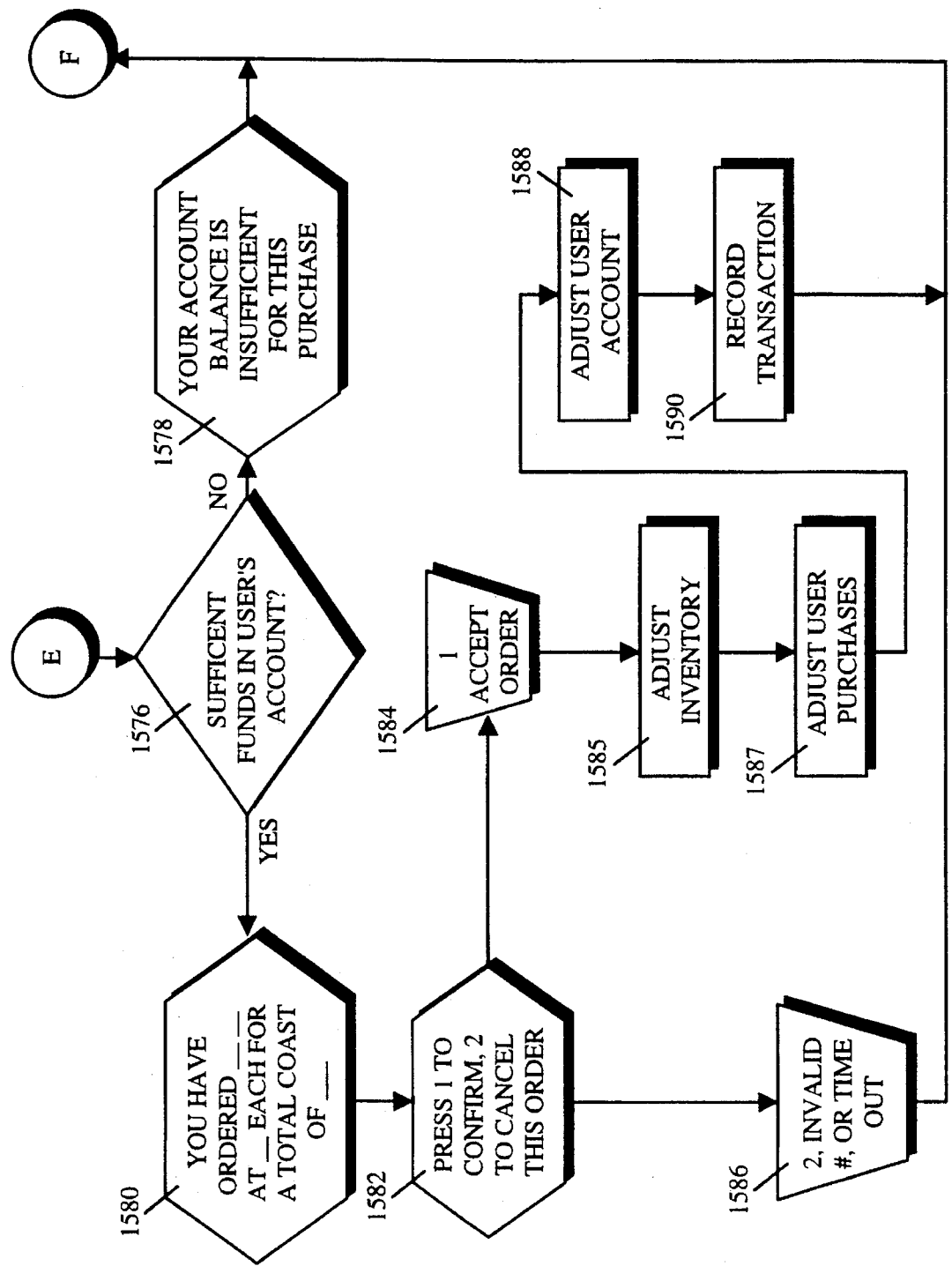

As indicated in FIGS. 4C, 4D the valid order criteria comprise checks on commissary privileges 1554, item availability based on user class 1562, item availability based on inventory 1566, quantity restrictions 1572, and account balances 1576. Additional criteria for determining the validity of an order may be added to steps 1554, 1562, 1566, 1572, and 1576. Further, the actual order in which steps 1554, 1562, 1566, 1572, and 1576 are performed is not critical, although some orderings may be more efficient than others.

Therefore a system is presented for automatically placing commissary orders through a premise-based telephone system of an institution. The system prompts a user to provide an identifier code and item codes, and compares these user provided codes with user status information and commissary inventory information, respectively, that is stored in the system. The comparison is based on valid order criteria that may be set and modified by commissary personnel or other authorized persons.

We claim:

1. In a premise-based telephone system for connecting calls from a plurality of telephone stations within an institution, a commissary system for automatically processing orders to the commissary of the institution through the telephone stations of the premise based telephone system, the commissary system comprising:

a memory device for storing user status information including a user name, a personal identifier, an account balance and a user class for each user of the commissary system, and commissary inventory information for each item offered by the commissary of the institution;

a processor coupled to the memory device and to a telephone station of the premise based telephone system;

a processor implemented control program for monitoring the telephone station, and responsive to a user entering a commissary telephone number, the control program instructs the processor to compare user status and inventory information with identifier and item selection information, respectively, provided by the user to determine whether authorization criteria are met and to update the user status information and generate a transaction record when authorization criteria are met; and a message generating device responsive to the processor, for communicating stored user status and commissary information to the user and requesting user identifier and item selection information from the user.

2. The system of clam 1, wherein the personal identifier is an alpha-numeric code.

3. The system of claim 2, wherein the personal identifier is a voice-code password.

4. The system of claim 1, wherein the stored commissary inventory information includes for each item offered by the commissary a catalogue number, a price, the number of items remaining in stock, and a maximum number of items that may be purchased in a selected period.

5. The system of claim 4, wherein the authorization criteria includes criteria selected from the group comprising: a valid user identifier, a user account balance sufficient to cover the price of items identified, sufficient inventory to provide the items identified; a user class authorized to purchase the items identified; and number of items identified less than a preselected number.

6. The system of claim 1, further comprising:

an input device for entering user status information and inventory information into the memory device of the commissary system; and an output device for downloading the transaction records generated by the commissary system.

7. A computer implemented method for processing commissary orders through a premise-based telephone system, the method comprising the steps of:

storing user status information including a personal identifier, a user name, an account balance, and a user class for each user of the commissary system and commissary inventory information;

receiving user-provided identifier information and item selection information entered from a telephone of the premise-based telephone system;

comparing the user-provided identifier information with the stored user status information to determine the user's commissary privileges;

comparing the user-provided item selection information with the user's commissary privileges and the commissary inventory information to determine whether a user can order the selected item;

generating an order when the comparison indicates that the item can be ordered by the user; and updating the user status information to reflect the order.

8. The method of claim 7, wherein the step of storing user status information and commissary inventory information includes storing for each item offered by the commissary a catalogue number, a price, the number of items remaining in stock, and a maximum number of items that may be purchased in a selected period.

9. The method of claim 7, wherein the step of comparing user-provided identifier information with the stored user status information comprises comparing the user provided identifier with the personal identifiers of a user status information file to identify user status information entries corresponding to the current user, including a user class, items and quantities purchased, and an account balance.

10. The method of claim 7, wherein the step of comparing user provided item selection information with the user's commissary privileges and the commissary inventory information comprises the substeps of:

comparing the item selection information with the catalogue numbers of the commissary inventory file to identify the commissary item selected;

comparing the number of items remaining in stock with the number of items requested by the user;

comparing the quantity of the item purchased by the user with any limit on the number of items that can be purchased in a given period; and comparing the cost of the requested number of items with the account balance of the user.

11. The method of claim 7, wherein the step of generating an order comprises the substeps of:

reporting to the user a cost for an authorized order; and requesting confirmation of the order from the user.

* * * * *